United States Patent
Chazen et al.

[11] Patent Number: 5,720,451
[45] Date of Patent: Feb. 24, 1998

[54] HIGH TEMPERATURE THRUST CHAMBER FOR SPACECRAFT

[75] Inventors: Melvin L. Chazen, Cerritos; Thomas J. Mueller, Lakewood; William D. Kruse, Redondo Beach, all of Calif.

[73] Assignee: TRW Inc., Redondo Beach, Calif.

[21] Appl. No.: 574,505

[22] Filed: Dec. 19, 1995

[51] Int. Cl.$^6$ ................................................. B32B 15/00
[52] U.S. Cl. ................................. 244/172; 428/610
[58] Field of Search ........................ 244/172; 428/610, 428/627, 632, 660, 661, 668, 620, 621

[56] References Cited

U.S. PATENT DOCUMENTS

| | | |
|---|---|---|
| 3,723,481 | 3/1973 | Bobear . |
| 4,917,968 | 4/1990 | Tuffias et al. . |
| 5,011,566 | 4/1991 | Hoffman . |
| 5,154,153 | 10/1992 | MacGregor . |

OTHER PUBLICATIONS

*Powder Processing in the Fabrication of Rhenium*, by Boris D. Bryskin nd Frank C. Danek, Journal of Materials, Jul. 19, 1991, pp. 24–26.

*Electrochemical Processing of Factory Metals*, by Donald R. Sadoway, Journal of Materials, Jul. 19, 1991, pp. 15–19.

*The Properties and Applications of Rhenium Produced by CVD* by Andre J. Sherman, Robert H. Tuffias and Richard B. Kaplan, Journal of Materials, Jul. 19, 1991, pp. 20–23.

Letter and Report sent by TRW to NASA–LeRC, Feb., 1994.

Letter and Report sent by TRW to NASA–LeRC, Mar., 1994.

*Primary Examiner*—Andres Kashnikow
*Assistant Examiner*—Tien Dinh
*Attorney, Agent, or Firm*—Michael S. Yatsko

[57] ABSTRACT

A high temperature thrust chamber for spacecraft (20) is provided herein. The high temperature thrust chamber comprises a hollow body member (12) having an outer surface and an internal surface (16) defining the high temperature chamber (10). The body member (12) is made substantially of rhenium. An alloy (18) consisting of iridium and at least alloying metal selected of the group consisting of rhodium, platinum and palladium is deposited on at least a portion of the internal surface (16) of the body member (12). The iridium and the alloying metal are electrodeposited onto the body member (12). A HIP cycle is performed upon the body member (12) to cause the coating of iridium and the alloying metal to form the alloy (18) which protects the body member (12) from oxidation.

18 Claims, 1 Drawing Sheet

U.S. Patent  Feb. 24, 1998  5,720,451
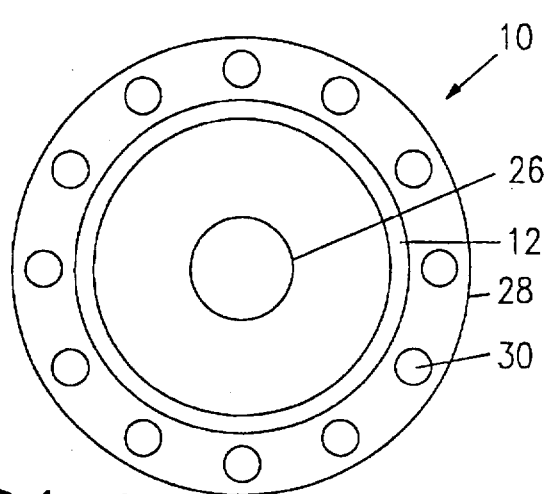
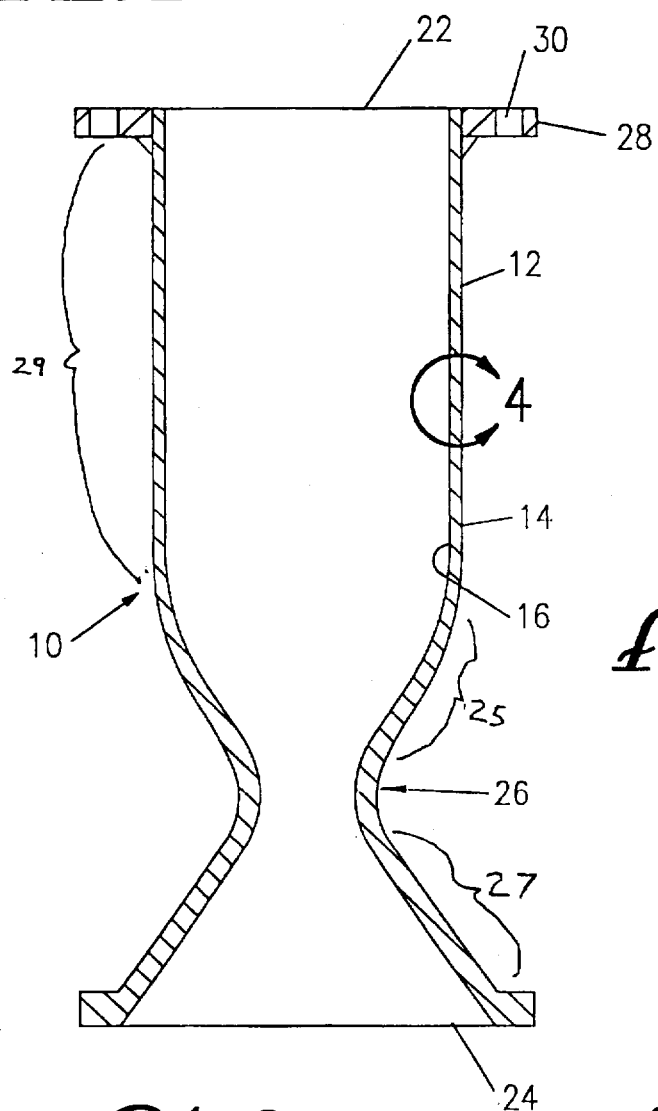
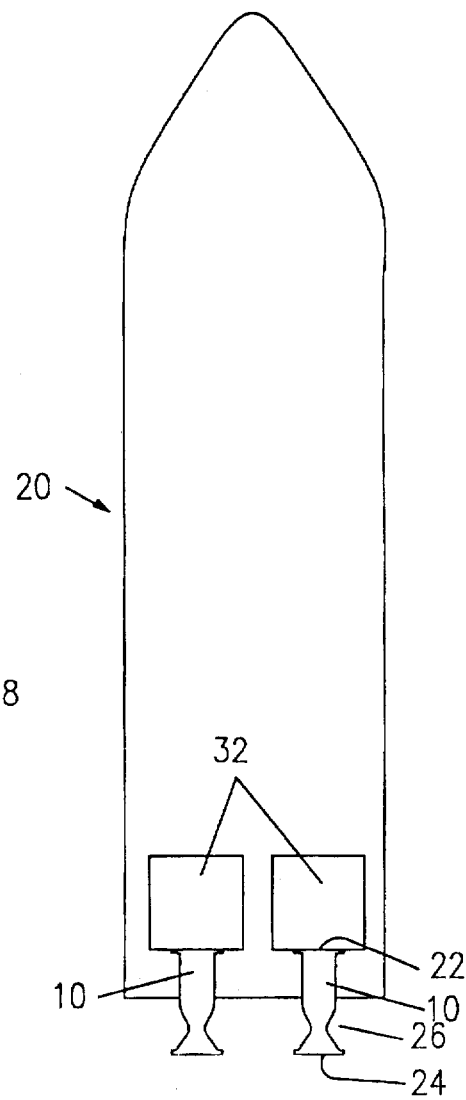
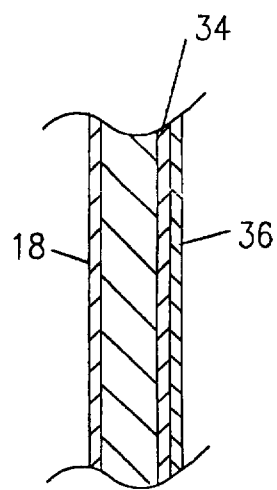

HIGH TEMPERATURE THRUST CHAMBER FOR SPACECRAFT

This invention herein described has been made in the course of or under U.S. Government Contract No. NAS3-26246 or a subcontract thereunder with NASA.

BACKGROUND

This present invention is directed to a high temperature thrust chamber and process for making a high temperature thrust chamber for spacecraft.

Spacecraft are required to carry increasingly large payloads into perigee, apogee or geosynchronous orbits around the earth. Present propulsion systems for the spacecraft typically utilize rocket engines having thrust chambers which are made of columbium coated with disilicide. These thrust chambers have a maximum operational temperature of about two thousand five hundred degree Fahrenheit (2500° F.). This limited maximum operational temperature limits the specific impulse of present rocket engines to about 320 pounds force-second per pound mass propellant.

The specific impulse of a rocket engine can be increased by increasing the operational temperature in the thrust chamber. Increasing the specific impulse increases efficiency of the propulsion system and allows the spacecraft to carry larger payloads or carry less fuel, thereby reducing operational costs. Thus, a high temperature thrust chamber is needed to achieve the increased performance requirements for future spacecraft.

One proposed high temperature thrust chamber is constructed by depositing iridium and then rhenium onto a mandrel using chemical vapor deposition (CVD). However, this proposed high temperature chamber is not entirely satisfactory since it is subject to structural failure caused by cyclic plastic strain of tension and compression resulting from extreme temperature cycles occurring during the mission, the vibration during launch and the pressure from the rocket engines. Further, this proposed high temperature chamber is relatively expensive to manufacture since the manufacturing process is labor intensive and difficult to reproduce.

Thus, there is a need for a high temperature thrust chamber which is operational at higher temperatures to increase the efficiency of the propulsion system, is resilient to structural failure and is relatively inexpensive to manufacture.

SUMMARY

The present invention is directed to a high temperature chamber and method for making a high temperature chamber that satisfies this need, the high temperature chamber being capable of withstanding high temperatures and is resilient to structural failure. Thus, the high temperature chamber when used with a rocket engine allows for a higher specific impulse, thereby increasing the efficiency of the spacecraft.

A high temperature chamber having features of the present invention includes a body member having an outer surface and an internal surface defining the high temperature chamber. The body member is made substantially of rhenium. An alloy comprising iridium and at least one alloying metal is deposited on at least a portion of the internal surface and iridium on the external surface. The alloying metal is selected from the group consisting of rhodium, platinum and palladium. Preferably, the alloying metal is rhodium since rhodium withstands high temperatures and is resistant to oxidation. As described in detail below, the high temperature chamber is operational at temperatures in excess of about four thousand degrees Fahrenheit (4000° F.).

The body member can include an inlet end, an opposed outlet end, a convergent nozzle, a throat, and a divergent nozzle. A chamber section of the body member extends between the inlet end and the convergent nozzle. Preferably, the entire chamber section is substantially covered with the alloy to protect the rhenium body member from corrosion and oxidation, since the chamber section is particularly subjected to corrosion from the rocket fuel.

Preferably, for ease and consistency in manufacturing, the coating of iridium is electrodeposited onto the internal and external surfaces to protect the entire internal surface from oxidation and, subsequently, the coating of the alloying metal is electrodeposited on the iridium coating in the chamber section.

Optimumly, after the internal surface is coated as detailed above, the thrust chamber is subjected to a Hot Isostatic Pressing (HIP) cycle, i.e., high temperature and pressure, to prevent blistering or bubbling of the coating during preliminary combustion.

Further, at least a portion of the outer surface, and more preferably the entire outer surface can be coated with hafnium oxide to increase the emittance of the thrust chamber so that the thrust chamber transfers heat efficiently to the atmosphere.

The invention also includes a method for making a high temperature chamber which includes the steps of manufacturing a hollow body member from rhenium and depositing on at least a portion of the internal surface of the body member an alloy comprising of iridium and at least one alloying metal:

Furthermore, the invention includes a high temperature surface having a body member which is made substantially of rhenium and an alloy comprising of iridium and at least one alloying metal deposited on at least a portion of the body member.

The present invention provides a high temperature chamber and method for making a high temperature chamber which is operational at high temperatures to meet the increased performance requirements of future spacecraft and is resilient to structural failure. Further, since the alloy is electrodeposited onto the internal surface, the high temperature chamber is relatively inexpensive to manufacture.

DRAWINGS

These and other features, aspects and advantages of the present invention will become better understood with reference to the following description, appended claims and accompanying drawings where:

FIG. 1 is a diagram view of a spaceship with a high temperature chamber having features of the present invention;

FIG. 2 is a side section view of a high temperature chamber having features of the present invention;

FIG. 3 is a top plan view of the high temperature chamber of FIG. 2; and

FIG. 4 is a cutaway view taken from line 4 in FIG. 2.

DESCRIPTION

A high temperature chamber 10 according to the present invention comprises (i) a hollow body member 12 having an outer surface 14 and an internal surface 16 and (ii) an alloy 18 comprising of iridium and at least one alloying metal selected from the group consisting of rhodium, platinum and palladium deposited on at least a portion of the internal surface 16 of the body member 12.

The high temperature chamber 10 is useful for any application which requires a high temperature surface or chamber such as a thrust chamber for spacecraft, i.e., a rocket, a satellite, or a space shuttle, a reaction chamber for chemical reactors, or a reaction chamber for nuclear reactors.

In the embodiment shown in the Figures, the high temperature chamber 10 is a thrust chamber for a spacecraft 20 and the body member 12 is hollow, cylindrical and includes an inlet end 22 and an outlet end 24. The cylindrical body member 12 converges to form a convergent nozzle 25 and diverges to form a divergent nozzle 27 between the inlet end 22 and the outlet end 24. A throat 26 of the body member 12 is positioned between the convergent nozzle 25 and the divergent nozzle 27. A chamber section 29 of the body member 12 extends from the inlet end 22 to proximate the convergent nozzle 25. Typically, the chamber section 29 is subjected to high levels of corrosion from the rocket fuel.

With reference to FIG. 2, the thickness of the thrust chamber varies between about 60 mils to about 200 mils. The convergent nozzle 25, the throat 26, the divergent nozzle 27 and the outlet end 24 are typically thicker than the rest of the body member 12 since they are subjected to higher levels of vibration and higher temperatures.

The body member 12 may also include a cylindrical attachment flange 28 having a plurality of attachment apertures 30 extending therethrough for the attachment of the body member 12 to a propulsion system 32 of the spacecraft 20. The attachment flange 28 is welded to the inlet end 22 or, alteratively, is fabricated as an integral part of the body member 12.

The body member 12 is made substantially of rhenium since rhenium has excellent strength characteristics at high temperatures and is resilient to structural failure. Preferably, the rhenium is 99.995% pure, 97% minimum theoretical density of rhenium, and has a maximum grain size of 0.006 inches to ensure the integrity of the body member 12.

The body member 12 is fabricated utilizing a powder metallurgy process. The powder metallurgy process includes filling a mold with rhenium powder and then applying pressure to the mold. Subsequently, the body member 12 is subjected to a sinter process.

Next, the body member 12 is subjected to a HIP cycle to consolidate any air or void spots in the body member 12.

A suitable body member 12 made from rhenium can be fabricated by Rhenium Alloys, located Elyria, Ohio.

Powder metallurgy processing of rhenium is described in the article entitled *Powder Processing in the Fabrication of Rhenium*, by Boris D. Bryskin and Frank C. Danek, Journal of Materials, Jul. 19, 1991, pages 24–26 which is incorporated herein by reference.

The internal surface 16 is coated with an alloy 18 comprising of iridium and at least one alloying metal selected from the group consisting of rhodium, platinum and palladium. The alloy 18 protects the rhenium body member 12 from corrosion from rocket fuel and oxidation. Preferably, the entire internal surface 16 is coated with iridium to protect the internal surface 16 from oxication. Since the alloying metal is only suitable for temperatures in the maximum range of 3300°–3500° F., preferably only the chamber section 29, which is particularly subjected to corrosion from the rocket fuel, is coated with the alloy 18.

Initially, the coating of iridium is electrodeposited onto the internal surface 16 of the body member 12 to protect the entire internal surface from oxidation. The thickness of the iridium coating varies between 2 to 10 mils and preferably is between 4 to 5 mils thick. A thicker coating of iridium allows the alloy 18 to spall or chip relatively easily while a thinner coating of iridium provides inadequate protection against oxidation for extended periods of time. A suitable vendor for performing the electrodeposition process is Electroform Nickel, Inc., located in Huntsville, Ala.

Electrodeposition processing is described in the article *Electrochemical Processing of Factory Metals*, by Donald R. Sadoway, Journal of Materials, Jul. 19, 1991, pages 15–19 which is incorporated herein by reference.

Subsequently, the coating of the alloying metal selected from the group consisting of rhodium, platinum and palladium is deposited on the iridium coating utilizing electrodeposition process in only the chamber section 29. The thickness of this coating of the alloying metal varies between 1 to 5 mils and preferably is between 2 to 3 mils. A thick coating is subject to spalling while a thinner coating provides inadequate protection from oxidation. A suitable vendor for performing the electrodeposition process is Electroform Nickel, Inc., located in Huntsville, Ala.

Preferably, a coating of iridium 34 is also electrodeposited onto the outer surface 14 of the body member 12 to protect the outer surface 14 from oxidation during fire testing of the thrust chamber at an altitude facility (not shown). Typically, the iridium is electrodeposited on the outer surface 14 and the internal surface 16 at the same time for ease of manufacturing. The thickness of the iridium coating on the external surface varies between 2 to 10 mils and preferably is between 4 to 5 mils. Similarly, a thinner coating is subject to spalling while a thinner coating does not provide adequate protection from oxidation. A suitable vendor for performing the electrodeposition process is Electroform Nickel, Inc., located in Huntsville, Ala.

Next, the chamber is subjected to a HIP cycle which causes the iridium coating and the metal selected from the group consisting of rhodium, platinum and palladium, to form the alloy which protects the body member 12 from oxidation during preliminary combustion. The HIP cycle consists of subjecting the chamber to a temperature of between 2500 and 3500 degrees Fahrenheit and a pressure of between about 25,000 and 40,000 PSI for about 2–8 hours.

Subsequently, a coating of hafnium oxide 36 can be applied to the outer surface 14 of the body to increase the emittance of the high temperature chamber 10. The thickness of the coating of hafnium oxide varies between 3 to 15 mils and more preferably is between 5 to 10 mils. A thicker coating is subject to spalling while a thinner coating may not provide the desired increase in emittance. The increased emittance enables the high temperature chamber 10 to efficiently transfer heat to the atmosphere and thus allows the high temperature chamber 10 to operate at cooler temperatures. The coating of hafnium oxide can be applied by plasma spraying or another suitable method. The coating of hafnium oxide can be plasma sprayed by Hitemco located in Old Bethpage, N.Y.

The high temperature chamber 10 and method for making the high temperature chamber 10 provided herein has many advantages over the prior art chambers, including an operational temperature of at least about four thousand degrees Fahrenheit (4000° F.), resilience to structural failure and being less expensive than prior art high temperature chambers 10 to manufacture.

Although the present invention has been described in considerable detail with reference to certain preferred versions, other versions are possible. For example, the rhenium body member 12 can be manufactured by chemical vapor deposition as described in the article *The Properties and Applications of Rhenium Produced by CVD* by Andrew J. Sherman, Robert H. Tuffias and Richard B. Kaplan, Journal of Materials, Jul. 19, 1991, pages 20–23 which is incorporated herein by reference. Therefore, the spirit and scope of the pending claims should not be limited to the description of the preferred version contained herein.

What is claimed is:

1. A high temperature chamber resistant to structural failure, comprising:
   (a) a hollow body member having an outer surface and an internal surface defining the high temperature chamber, the body member being molded substantially of powdered rhenium;
   (b) on at least a portion of the internal surface of the body member an alloy comprised of iridium and at least one alloying metal selected from the group consisting of rhodium, platinum and palladium; and
   (c) a coating on said outer surface comprising hafnium oxide.

2. The high temperature chamber of claim 1 wherein the alloying metal is rhodium.

3. The high temperature chamber of claim 1 wherein the body member is made substantially by powder metallurgy processing.

4. The high temperature chamber of claim 1 wherein at least a portion of the outer surface is coated with iridium.

5. The high temperature chamber of claim 1 wherein the alloy is electrodeposited onto the internal surface.

6. The high temperature chamber of claim 1 wherein the iridium is electrodeposited onto the internal surface.

7. The high temperature chamber of claim 1 wherein the alloying metal is electrodeposited onto the internal surface.

8. The high temperature chamber of claim 1 wherein (i) the body member includes an inlet end, an outlet end and a chamber section between the inlet end and the outlet end, and (ii) the chamber section is substantially coated with the alloy.

9. The high temperature chamber of claim 1 wherein the alloy is subject to a hot isostatic pressing cycle.

10. A propulsion system utilizing the high temperature chamber of claim 1.

11. The high temperature chamber of claim 1 embodied in a spacecraft rocket engine.

12. A method for making a high temperature chamber resistant to structural failure comprising the steps of:
    (a) molding a hollow body member having an outer surface and an internal surface defining the high temperature chamber, the body member being made substantially of powdered rhenium;
    (b) depositing on at least a portion of the internal surface of the body member an alloy comprised of iridium and at least one alloying metal selected from the group consisting of rhodium, platinum and palladium;
    (c) subjecting the chamber to a hot isostatic pressure cycle for a period of about two to eight hours; and
    (d) applying a coating of hafnium oxide to the outer surface of the body, thereby increasing the resilience of the chamber to structural failure.

13. The method of claim 12 wherein the step of manufacturing the body member includes manufacturing the body member by powder metallurgy processing.

14. The method of claim 12 comprising the step of depositing iridium on at least a portion of the outer surface.

15. A high temperature chamber for use in a spacecraft rocket engine resistant to structural failure which comprises;
    (a) a hollow body member having an outer surface and an internal surface defining the high temperature chamber, the body member being made substantially of rhenium;
    (b) a coating of iridium electrodeposited onto a portion of the internal surface and a portion of the outer surface;
    (c) a coating of at least one alloying metal selected from the group consisting of rhodium, platinum and palladium electrodeposited on the internal surface coating of iridium; and
    (d) a coating of hafnium oxide applied to the outer surface of the chamber;
    whereby said chamber is rendered resistant to structural failure.

16. The high temperature chamber of claim 15 wherein the coating of iridium and the coating of the alloying metal are subjected to a hot isostatic pressing cycle.

17. The high temperature chamber of claim 15 wherein the body member is made substantially by powder metallurgy processing.

18. The high temperature chamber of claim 15 wherein the alloy is subjected to a hot isostatic pressing cycle.

* * * * *